Mar. 3, 1925.
W. J. NOONAN
HEATING AND COOLING APPARATUS
Filed May 31, 1924   3 Sheets-Sheet 1
1,528,300
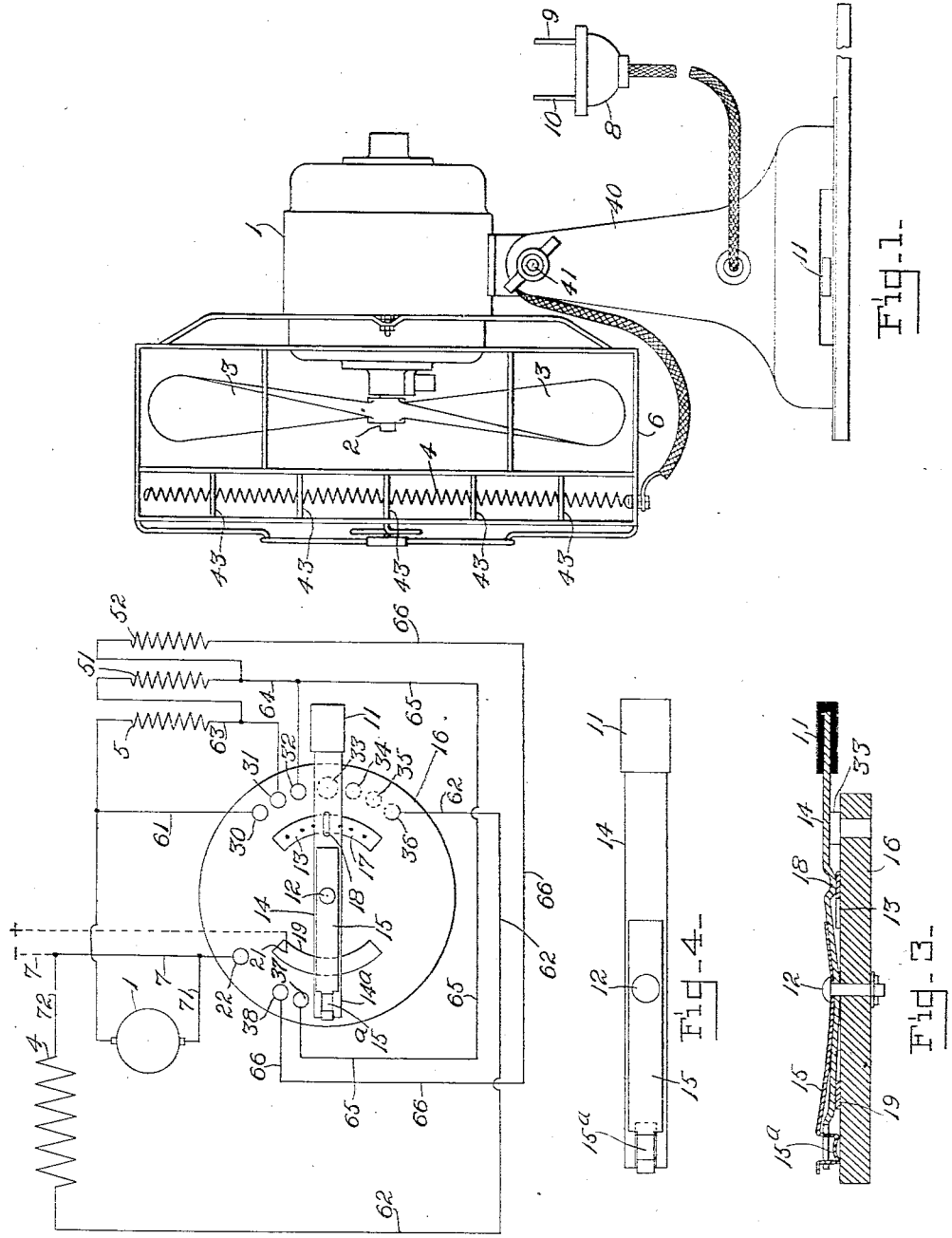

Mar. 3, 1925.

W. J. NOONAN

HEATING AND COOLING APPARATUS

Filed May 31, 1924

INVENTOR:
William J. Noonan
By Macleod, Calver, Copeland & Dike
ATTORNEYS.

Mar. 3, 1925.  
W. J. NOONAN  
1,528,300  
HEATING AND COOLING APPARATUS  
Filed May 31, 1924  3 Sheets-Sheet 3

INVENTOR:
William J. Noonan
by Macleod, Calver, Copeland & Dike
ATTORNEYS

Patented Mar. 3, 1925.

1,528,300

UNITED STATES PATENT OFFICE.

WILLIAM J. NOONAN, OF MANSFIELD, MASSACHUSETTS.

HEATING AND COOLING APPARATUS.

Application filed May 31, 1924. Serial No. 716,866.

*To all whom it may concern:*

Be it known that I, WILLIAM J. NOONAN, a citizen of the United States, residing at Mansfield, county of Bristol, State of Massachusetts, have invented a certain new and useful Improvement in Heating and Cooling Apparatus, of which the following is a specification, reference being had therein to the accompanying drawings.

The invention relates to an electric heating apparatus in which there is employed an electric heater, a fan driven by an electric motor, and means for cutting out the current through the heater at will and yet permit the motor and fan to be operated, also means for cutting out the motor and fan while the heater remains operative.

The fan is employed to circulate or distribute the heated air when the heater is in operation during cool weather and to agitate the air for comfort when the heater is cut out during hot weather.

For summer use when no heat is required it is desirable to be able to drive the fan at different speeds according to the temperature, that is, at high speed when it is hottest and to reduce the speed when the temperature is lowered. It is also desirable in cool weather when the heater is in operation to drive the fan for the purpose of distributing the warm air and to drive it at varying speeds according to varying purposes.

One feature of the invention consists in the means for varying the speed of the motor and fan. Another feature of the invention consists in means for varying the number of heating coils cut in so as to vary the amount of heat. Another feature of the invention consists in means whereby electric contacts for controlling the amount of resistance and the contacts for controlling the speed of the motor and fan may be made simultaneously but with independent tension.

Another feature relates to means for utilizing the heating coils for cooking purposes.

Other features of the invention will be set forth and described hereinafter.

In carrying out the invention, there is provided a resistance member in series with the motor and a number of contact points with which a switch is adapted to be engaged according to the position of the switch so as to cut in more or less of the resistance in the series according to the speed at which it is desired to drive the fan and without connecting up the heating coil during warm weather. For cold weather use, when it is desired to connect up with the heating coil and to drive the fan for the purpose of distributing the heat, there are two sets of contacts with which the switch is adapted to engage, one set of contact members serving to close the circuit through the heating coil and the other set to close the circuit through the resistance and the motor. These contact members are so positioned that more or less resistance in the motor circuit is cut in according to the speed at which it is desired to drive the fan. Means are also provided whereby when the switch is moved to a certain position, the circuit through the motor is cut out whereby the fan is stopped while the circuit through the heater remains closed.

In a modified form of the invention there are provided means for varying the amount of heat and for varying the speed of the fan as the amount of heating units is varied.

The reason for the two different speeds to be applied to the same quantity of heat is that in small rooms, bathrooms, sick chambers, etc., the fan can be run very slow producing a small volume of air which will be heated to a higher temperature than it is heated when the fan is running faster and producing a greater volume of air. This faster speed can be used in circulating a dry air for such purposes as frost off windows, drying clothes or different purposes of this kind. The larger unit being intended for other than household use, the amount of heat that can be applied to each contact is practically unlimited. In this larger unit there are four contacts made simultaneously, namely, the main contact for the heating member, an auxiliary contact for another heating unit, a contact for the motor and fan, and a contact where the current comes in. The tensions of the several contacts are all independent of the other.

The invention will be fully understood from the following description when taken in connection with the accompanying drawings and the novel features will be pointed out and clearly defined in the claims at the close of this specification.

Fig. 1 is a side elevation of apparatus embodying the invention in which only one heating coil is employed, the motor being adjusted with its shaft in a horizontal position.

Fig. 2 is a diagrammatic view showing the wiring and the contact and switch members.

Fig. 3 is a sectional view through the switch base and switch lever.

Fig. 4 is a detail plan view of the switch lever.

Figure 6:
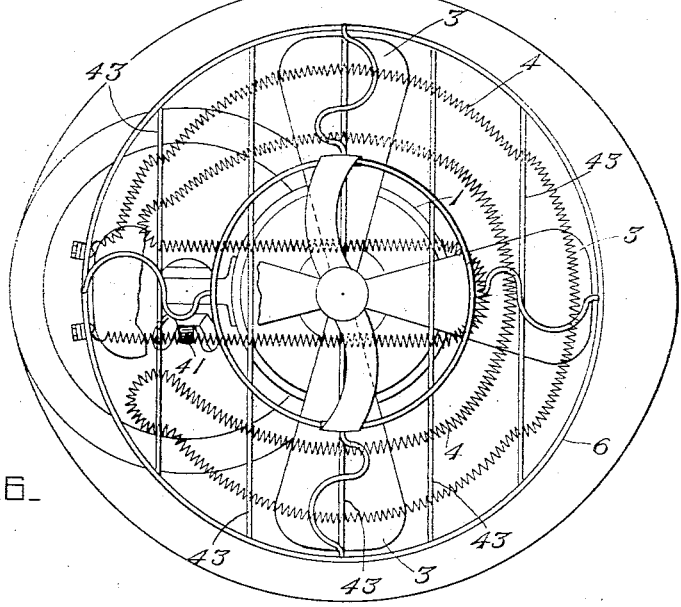
Fig. 6 is a plan view of Fig. 5.

Referring now to the drawings: There is shown at 1 an electric motor having a rotary shaft 2 on which is mounted a fan 3. At 4 is shown a heating coil and at 5, 51 and 52 a plurality of resistance coils in series with the motor. At 6 is represented the positive wire and at 7 the negative wire of a circuit connected respectively with the positive and negative pins 9, 10 of a plug 8 for connection with any suitable source of current, as for instance with a house circuit.

Preferably the switch lever is a two-part lever, although not necessarily so. In the drawings it is shown as a two-part lever as follows:

At 11 is shown the handle of a two-part switch lever pivoted at 12. One member of the switch lever is shown at 14 and the other member at 15. The member 14 consists of a strip of spring metal, preferably brass, having an insulated handle 11. The member 15 is also of spring metal and is mounted on the member 14. Said members 14 and 15 are pivotally secured to an insulation base 16 by the headed pin 12 which passes through both members 14, 15. The arm of said switch member 14 which is on the handle side of the pivot slides on a rest bar 13 which is preferably arc-shaped. The said bar 13 is formed with a series of humps 17 spaced slightly apart from each other forming notches between them, and the switch member 14 is formed with a hump 18 on its underside which is adapted to engage in the notches between the humps 17 of the rest bar 13 to hold the switch in its adjusted position when the member 14 is in contact with one of the contact pins 30, 31, 32, 33, 34, 35, 36 hereinafter described.

As the switch lever 14 is held down at the pivot point by the head of the pivot pin 12 that arm of the lever 14 which bears on the rest bar 13 has to be sprung up slightly to bring it onto the upper side of the rest bar 13 so that it will bear on the contact pins hereinafter described. The switch lever is thus maintained under tension where it engages the contact pins.

The arm 14ª of the switch member 14 on the opposite side of the pivot from the rest bar 13 rides on a contact strip 19 secured to the insulation base 16. The arm 14ª is formed with a slot 14ᵇ and the superposed switch member 15 is formed with a bent tongue 15ª which extends down through the said slot to form a contact with the contact pins 37, 38 to be hereinafter described. Said member 15 is of spring metal and its free end is put under tension when it is sprung up as by riding over the convex heads of the contact pins, thus giving the tension to the arm 15 independent of the tension of the arms 14ª or 14.

The positive leading-in wire 6 of the main line is in electrical connection with the positive contact bar 19 through a binding post at 21. The negative leading-in wire 7 is connected with the insulated base 16 by a binding post at 22. A branch 71 from the negative wire 7 leads to the motor 1. A branch 72 from the negative wire 7 leads to the heating coil 4.

The switch member 14 is in contact with the positive contact strip 19 and therefore with the leading-in wire 6 in all of the adjusted positions of the switch lever. A positive wire 61 leading to the motor is adapted to be electrically connected with the positive leading-in wire 6 through the contact strip 19, switch arm 14 and the contact pin 30 so that when the switch lever is moved over to engage with pin 30 the circuit may be made through the motor without passing through any of the resistance coils 5, 51, 52 or through the heating coils and the fan will be driven its fastest.

The contact pins 31, 32 have respectively electric connection through the wires 63, 64 with the resistance coils 5, 51 respectively.

An insulated projection 33 is provided as a seat for the switch lever to maintain it in neutral position when desired. As the resistance coils are in series, when the switch lever is moved into engagement with the contact pin 32 it will cut in the resistance of coil 5, so that the motor and fan will be driven at slower speed than when the contact is with pin 30. When the switch is moved into contact with pin 32, the resistance coils 5 and 51 will both be cut in and the motor and fan will be driven slower. It is obvious that the number of resistance coils and contact pins may be made as many as desired and thereby make possible a greater number of changes in speed.

When the switch is in contact with any one of the pins 32, 31 or 30 or any other contact on that side of the neutral 33, the arm 15 is entirely out of electrical contact with any of the contact members which close the circuit through the heating coil and therefore inoperative. A plurality of contact pins 34, 35 and 36 are provided on the opposite side of the neutral from the pins 30, 31, 32 for making connection through the switch with the heating coils. These pins 34, 35, 36 are all in series with each other so that contact of the switch with any one of them will close the circuit through the positive wire 62 which leads to the heating coils thus giving the same unit of heat whether the connection is made through one or another of the pins 34, 35, 36.

A plurality of contact pins 37, 38 are provided with which the tongue 15ª of the switch arm 15 is adapted to engage respectively when the switch lever is turned to bring that portion of the arm 14 which is on the handle side of the pivot into engagement with one of the pins 34, 35.

The pin 37 is electrically connected by wire 65 with the resistance coil 51, preferably by intermediate connection with wire 64 which leads from contact pin 32. Contact pin 38 is electrically connected by wire 66 with the resistance coil 52.

When the switch lever is turned to bring the main switch arm 14 into contact with the pin 34, the tongue 15ª of the arm 15 will simultaneously contact with pin 37. The positive connection with the motor will then be made through the wire 6, contact strip 19, switch arm 15, tongue 15ª, contact 37, wires 65 and 64, resistance coils 51 and 5 and wire 61, bring the same resistance as when the switch was moved in the opposite direction into contact with pin 32 and giving the same speed to the motor and fan as by moving the switch to the summer side of the neutral. At the same time the circuit through the heating coil will be closed by the arm 14, pin 34, and wire 62.

When the switch is turned further over on the heating side to bring the arm 14 into contact with pin 35 the tongue 15ª will engage pin 38 and the circuit to the motor will be closed through the wire 66 and all of the resistance coils 52, 51 and 5 and through wire 61 and thus the full amount of resistance is cut in and the motor and fan will run still slower, more slowly than the slowest on the summer side of the switch on account of the additional resistance cut in, but the connection with the heating coils through the pin 36 and wire 62 will maintain the same heat unit as previously.

When the switch is moved over another point to the third pin 36 the furthest on that side of the neutral, the tongue 15ª at the opposite end of the switch will have moved out of contact with the pin 38 and entirely out of connection with any of the wires leading to the motor so that the circuit through the motor will be broken and therefore the fan will stop. The circuit through the heating coil, however, will remain closed but there will be no movement of the fan. This arrangement is provided so that the heater, if desired, may be used for cooking or on any other occasion when it is desired to have the fan out of operation.

A special construction is provided for convenience in using the heater for cooking purposes.

Figure 5:
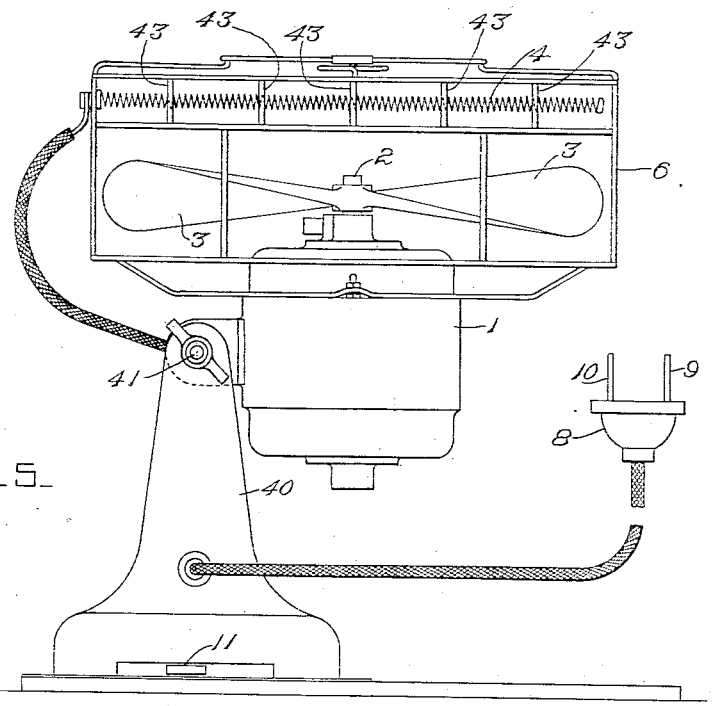
Fig. 5 is a side elevation of the apparatus shown in Fig. 1 with the motor adjusted on its axis to set the heating coil and dish support in a horizontal position.

To this end preferably the motor 1 is mounted on a standard 40 by a swivel joint 41 in such manner that the motor may be adjusted with its shaft horizontal as shown in Fig. 1 so that the fan will rotate in a vertical plane, or if desired, it may be turned to any other angle. When used for cooking purposes, however, it is preferable to have the motor adjusted so that its shaft will be in vertical position as shown in Fig. 5, and to cut out the current which drives the motor and fan. There is provided a wire cage 42 which surrounds the fan and on this cage there are mounted a plurality of flat metallic strips 43 formed with apertures through which the heating coils 4 pass. These strips are tied together and form a frame which serves to support the heating coils in proper position. When the motor is turned on its swivel 41 to bring the shaft 2 into vertical position as shown in Fig. 5, the heating coils and the supporting frame will be in horizontal planes. Mounted on the frame and co-axial therewith is a dish support 44 preferably of wire which when the motor is turned on its swivel to bring the said frame into the horizontal position will form a support on which a dish or any kind of a container may be placed for heating or cooking. By such arrangement water may be heated or food may be cooked or any article which it is desired to be heated may be placed thereon.

Figure 7:
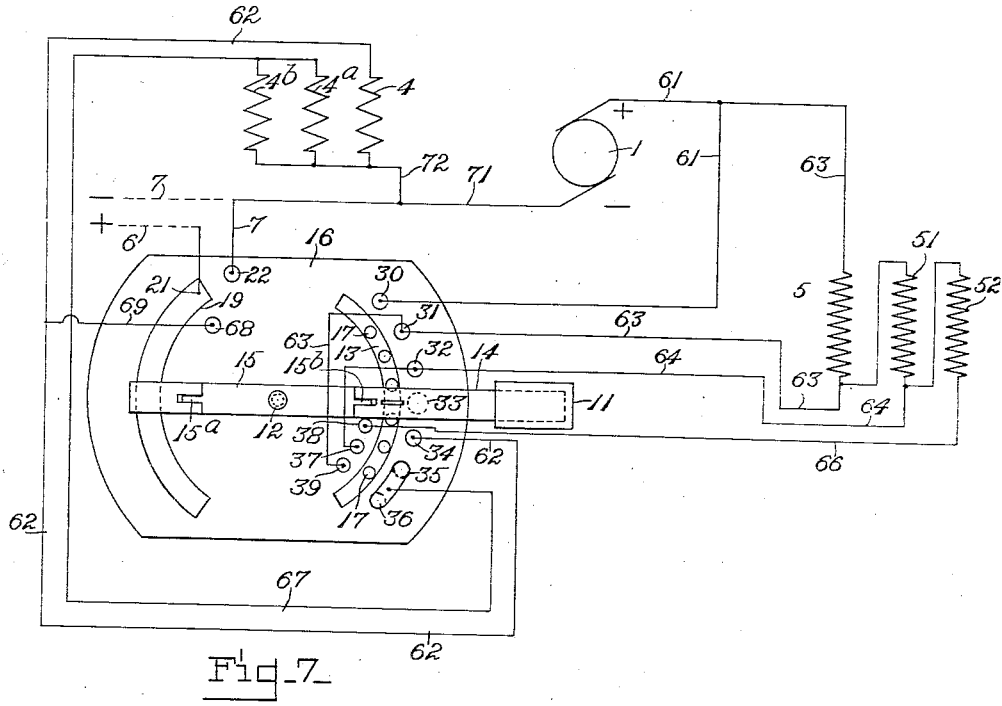
Fig. 7 is a diagrammatic view of a modified form of apparatus showing a plurality of heating coils and means for varying the number of heating units in action.
Figure 9:
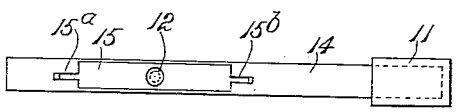
Fig. 9 is a detail plan view of the switch lever of Fig. 7.
Figure 8:
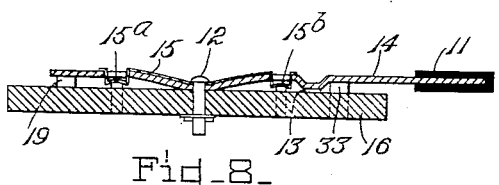
Fig. 8 is a section through the switch base and lever of Fig. 7.

The modified form shown in Figs. 7, 8 and 9 is intended for use where a larger space is to be heated than for ordinary domestic use and where it is desirable to have more variation in the amount of heat and in the means for distributing the heat. In this form of apparatus, means are provided both for varying the supply of heat and for varying the speed of the fan to correspond with the variation in the heat units.

For summer use of this apparatus when the heat units are entirely cut out and the fan only is intended to be operative the switch lever will be operated in the manner previously described to control the speed of the fan. The means provided to produce a variation of heat and a corresponding variation in the speed of the fan is as follows: (see Figs. 7, 8 and 9). There are three heating coils 4, 4ª and 4ᵇ, the coil 4 being in the circuit formed in part by the negative wire 72 and the positive wire 62 as previously described. The heating coils 4ª and 4ᵇ are in series with each other and are connected by wire 72 with the leading-in negative wire 7 and are connected with the positive contact members 35, 36 by the wire 67. The contact members 35 and 36 are in series with each other as shown and described in connection with the device shown in Fig. 2, but they are not in series with the contact member 34 for the reason to be hereinafter set forth. Contact members 38 and 37 are electrically connected with the resistance coils 52 and 51 respectively by the wires 66 and 64 in this modified form in a similar manner as in the smaller unit previously described and shown in Fig. 2.

The resistance coil 5 is connected with contact member 39 by wire 63, the said contact member 39 being in series with contact member 31.

In this modified form the contact members 38, 37 and 39 are disposed on the base 16 on the opposite side of the pivot 12 from the arrangement of the contacts 38 and 37, shown in Fig. 2. In order, therefore, for the switch arm 15 to make a contact with members 38, 37 and 39, said switch arm 15 is provided with a tongue 15ᵇ under tension similar to the tongue 15ª, and said tongue 15ᵇ extends down through a slot 14ᶜ in the arm 14 and is adapted to engage under tension with the contact members 38, 37 and 39 in the several adjusted positions of the switch.

When heat is desired, the switch lever is moved over to the heating side of its neutral position, as previously described in connection with the smaller unit, and is set at different stations to make contact with the several members 38, 37 and 39 according to the amount of heat required. When it is moved to the first station, the arm 14 on the handle side of the pivot will make contact with member 34, the further arm of said lever being, as previously described, always in engagement with the contact bar 19. In this position of the switch the tongue 15ᵇ will be in engagement with contact member 38. The engagement of the switch with the contact member 34 will close the circuit through the wire 62 and heating coil 4. At the same time the engagement of the tongue 15ᵇ with contact member 38 will close the circuit through the resistance coil 52 and the motor which cuts in the full resistance and the same is driven at its slowest speed while the single heating coil 4 alone is active, the same as in the small unit, shown in Fig. 2.

When the switch is moved over to the second station on the heating side, the switch tongue 15ᵇ will engage with the contact member 37 to close the circuit through the wire 64 and the resistance coil 51 thus cutting out part of the resistance and causing the same to rotate faster. At the same time the switch arm 14 will engage with the contact member 35 and close the circuit through the wire 67 and the two heating coils 4ª and 4ᵇ which are in series and will cut out the heating coil 4. This doubles the amount of heat that was furnished when the switch was at the first station and the fan is driven faster thereby distributing the heated air faster and more widely.

When the switch is moved over to the third station, the tongue 15ᵇ will engage with contact member 39 and close the circuit through the wire 63 and the resistance coil 5 cutting out the resistance coils 51 and 52 and thus the fan will run still faster than before. In this position of the switch the arm 14 will be in contact with member 36 but as the members 35 and 36 are in series, the circuit will still remain closed through wire 67 and the two heating coils 4ª and 4ᵇ. Means are provided whereby when the switch is in this position, the heating coil 4 will again be brought into the circuit thereby adding that heating unit to the two heating units furnished by coils 4ª and 4ᵇ. The means provided for this purpose are as follows: A contact pin 68 is mounted on the base 16 in position to be engaged by the switch tongue 15ª when the switch is at the third station and a wire 69 leads from said contact member 68 and is tapped onto the wire 62 leading to heating coil 4. Thus when the switch is at the third station the three heating coils 4, 4ª and 4ᵇ will be operative and the resistance coil 5 is the only resistance left in the motor circuit so that the fan will run faster than previously, while the heat furnished is greater and will be distributed by the fan still faster and more broadly.

What I claim is:

1. In combination with an electric motor, a fan driven thereby, an electric heating member, electric circuits therefor, means for varying the heat units, a resistance member in series with the motor, and means whereby more or less resistance as desired may be cut in to vary the speed of the fan, in such manner that as the heat is increased the speed of the fan can be increased.

2. In combination with an electric motor, a fan driven thereby, a plurality of electric heating members, electric circuits therefor, a resistance member in series with the motor, means for closing at will the circuit through said resistance member, means whereby more or less of the heating members as desired may be cut into the circuit to vary the heat, means whereby more or less resistance as desired may be cut into the motor circuit, to vary the speed of the fan and means whereby the variation of resistance and the variation in number of heating units are simultaneously controlled.

3. In combination with an electrically driven fan, means for varying the speed of the fan, a plurality of electric heating units, means whereby the number of said heating units which are effective at any one time may be varied at will, and means whereby the variation in number of effective heating units and the variation in speed of the fan are simultaneously controlled.

4. In combination with an electrically driven fan, means for varying the speed of the fan, a plurality of electric heating units, means whereby the number of said heating units which are effective at any one time may be varied at will, and means whereby the variation in number of effective heating units and the variation in speed of the fan are simultaneously controlled in such manner that the speed of the fan is increased as the number of effective heat units is increased.

5. In combination with an electrically driven fan, means for varying the speed of the fan, an electric heating member, means for varying the amount of heat at will, and means for simultaneously varying the speed of the fan and the amount of heat.

6. In combination with an electrically driven fan, means for varying the speed of the fan, an electric heating member, means for varying the amount of heat at will, and means for simultaneously varying the speed of the fan and the amount of heat in such manner that the speed of the fan is increased or reduced as the heat is increased or reduced.

7. In combination with an electric motor, a fan driven thereby, an electric heating member adjacent the fan, separate shunt electric circuits for the motor and heating member a plurality of resistance members in series with the motor, a switch lever, means whereby at will the switch may be adjusted to close the circuit directly through the motor and the resistance member without closing the circuit through the heating member and means whereby at will the same switch may be adjusted to close the circuit through the motor and also through the heating member at the same time.

8. In combination with an electric motor, a fan driven thereby, an electric heating member adjacent the fan, separate shunt electric circuits for the motor and heating member, a plurality of resistance members in series with the motor, a switch lever, means whereby at will the switch may be adjusted to close the circuit directly through the motor and the resistance member without closing the circuit through the heating member and means whereby the same switch may be adjusted to open the circuit through the motor and résistance member and close the circuit through the heating member.

9. In combination with an electric motor, a fan driven thereby, an electric heating member adjacent the fan, separate shunt electric circuits for the motor and heating member, a resistance member in series with the motor, a switch lever, means whereby at will the switch may be adjusted to close the circuit directly through the motor and the resistance member without closing the circuit through the heating member, means whereby at will the same switch may be adjusted to close the circuit through the motor and also through the heating member at the same time, and means whereby more or less resistance may be cut in at will.

10. In combination with an electric motor, a fan driven thereby, an electric heating member adjacent the fan, separate shunt electric circuits for the motor and heating member, resistance member in series with the motor, a switch lever, means whereby at will the switch may be adjusted to close the circuit through the motor and the resistance member while the circuit through the heating member remains open, means whereby at will the switch may be adjusted to close the circuit through the motor and also through the heating member at the same time, said switch lever having two contact arms with independent tension and which are moved as one in either direction, means whereby one of said arms closes the circuit through the motor and resistance member, and means whereby the other of said arms closes the circuit through the heating member.

11. In combination with an electric motor, a fan driven thereby, an electric heating member adjacent the fan, separate shunt electric circuits for the motor and heating member, a resistance member in series with the motor, a switch lever, means whereby at will the switch may be adjusted to close the circuit through the motor and the resistance member while the circuit through the heating member remains open, means whereby at will the said switch may be adjusted to close the circuit through the motor and also through the heating member at the same time, said switch lever having two contact arms with independent tension and which are moved as one in either direction, means whereby one of said arms closes the circuit through the motor and resistance member, and means whereby the other of said arms closes the circuit through the heating member, said arms comprising two resilient metal strips having a common pivot on which the said combination lever turns.

12. In combination with an electric motor, a fan driven thereby, an electric heating member adjacent the fan, separate shunt electric circuits for the motor and heating member, a resistance member in series with the motor, a switch lever, means whereby at will the switch may be adjusted to close the circuit through the motor and the resistance member while the circuit through the heating member remains open, means whereby at will the switch may be adjusted to close the circuit through the motor and also through the heating member at the same time, said switch lever having two contact arms with independent tension and which are moved as one in either direction, means whereby one of said arms closes the circuit through the motor and resistance member, and means whereby the other of said arms closes the circuit through the heating member, said arms comprising two resilient metal strips having a common pivot on which the said combination lever turns, one of said switch arms being formed with a slot and the other arm having a tongue which extends through the said slot and is adapted to form a contact with an underlying contact member.

13. In combination with an electric motor, a fan driven thereby, an electric heating member adjacent the fan, separate electric circuits for the motor and heating member, a resistance member in series with the motor, a switch lever comprising two resilient contact members, a pivot for said two members intermediate their ends, said two contact members of the lever being connected so that they turn as one in either direction on said pivot, two sets of contact elements with which the outer arms of said switch members are respectively adapted to simultaneously engage to close the circuit through the motor and through the resistance member and another set of contact elements with which the other arm of one of said switch members is adapted to engage to close the circuit through the heating member, each of said contact arms of the switch having its own tension independent of the other.

14. In combination with an electric motor, a fan driven thereby, an electric heating member, electric circuits therefor, a resistance member in series with the motor, and means for closing at will the circuit through said resistance member to slow the motor and fan, a base on which the motor is mounted by a swivel connection in such manner that the motor may be adjusted so that the axis of the shaft will be in a horizontal position, a frame support for the heating coils and a shelf secured to said frame which when the motor is turned to bring its shaft into a horizontal position overhangs the heater and is adapted to support a cooking receptacle.

In testimony whereof I affix my signature.

WILLIAM J. NOONAN.